April 5, 1932.    N. S. HARRINGTON    1,852,847
WELDING AND BRAZING ROD
Filed Oct. 15, 1928
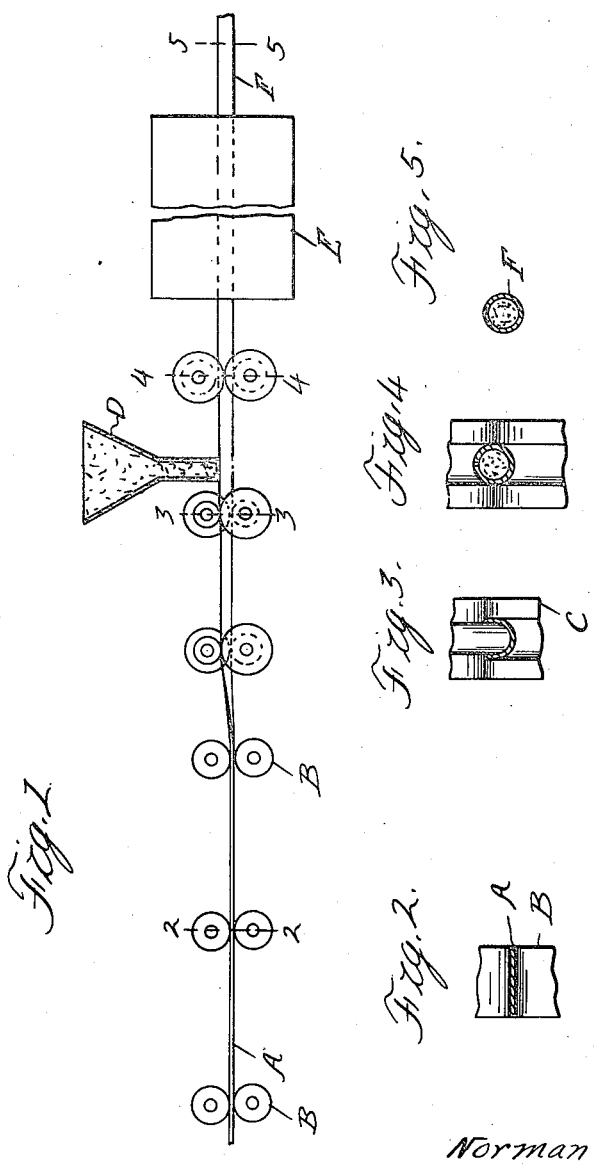
INVENTOR
Norman S. Harrington
BY
ATTORNEY Patented Apr. 5, 1932

1,852,847

UNITED STATES PATENT OFFICE

NORMAN S. HARRINGTON, OF CLEVELAND, OHIO, ASSIGNOR, BY MESNE ASSIGNMENTS, TO GENERAL ELECTRIC COMPANY, A CORPORATION OF NEW YORK

WELDING AND BRAZING ROD

Application filed October 15, 1928. Serial No. 312,712.

The invention relates to composite metal rods for welding, brazing and other analogous purposes.

One of the objects of the invention is to provide a welding or brazing rod containing all the necessary ingredients for the formation of a metallic joint of the desired composition, said ingredients being present in such form as to be readily fused into a homogeneous alloy.

Another object is to provide a welding or brazing rod having both the alloy and the flux required for the welding or brazing operation in a self-contained form without requiring any extraneous binder.

A further object is to provide a welding or brazing rod having comminuted metals within a tubular container and having the flux also within the tubular container, the flux being fused to unite the metallic particles to the container.

My invention contemplates the manufacture of a composite rod for welding or brazing purposes in which there is an outer metallic shell or sheath made of a metal or alloy adapted to enter into the composition and there are one or more comminuted metals or alloys arranged within the shell, said metals or alloys (sometimes designated as spelter) being present in such proportions as to form with the outer shell the desired composition when the rod is fused. Within the shell is also placed the amount of flux best suitable for the welding or brazing operation and in order to permanently retain the ingredients within the shell the composite rod is subjected to a temperature sufficient to fuse the flux and thereby bind the spelter to the shell.

The process may be applied to composite rods adapted for various purposes by suitably choosing the composition of the shell, the spelter and the flux.

The rods may be used for welding, brazing or soldering and may be applied to various metals and alloys such as carbon steel, high speed steel, nickel steel, vanadium steel, cast iron, aluminum and other alloys.

As an example of one embodiment of my invention, a brazing rod may be constructed adapted to deposit a fused alloy having a bronze composition containing copper, zinc and tin in substantially the following proportions:

| | Per cent |
|---|---|
| Copper | 60 |
| Zinc | 38 |
| Tin | 2 |

One method of constructing a brazing rod for the above purpose is to provide a thin brass tube or a sheet brass shell of U-shaped cross section, the brass being of a composition readily obtainable in the sheet form and having, for example, from 60 to 66⅔% copper and 40 to 33⅓% zinc. Within this tube or shell is placed a mixture of fine spelter and flux, the spelter being preferably of a composition containing tin in addition to copper and zinc. For example, a spelter containing approximately 60% copper, 37% zinc and 3% tin may be used but the exact composition must in any given case depend upon the relative amounts of spelter and brass container and the composition of the spelter may be suitably varied to give the desired final composition when both alloys are fused together. The flux is mixed with the spelter in such proportions that when the rod is melted there will be just sufficient fluxing material to properly flux the spelter and the outer shell without addition of any other fluxing material during the brazing operation. Any suitable fluxing material may be used such, for example, as borax. After the mixture of flux and spelter is placed within the outer shell, the brazing rod is then subjected to a temperature high enough to cause the flux to melt and surround the particles of spelter. Upon cooling the rod the flux solidifies into a glass-like composition, coating the particles of spelter and adhering to the walls of the shell thereby forming a binder and retaining the spelter and flux in permanent position within the shell.

The brazing rod, as above described, has many advantages, amongst which are that the speed of the brazing operation is greatly accelerated, the material is better fluxed, there is less flux deposit on the finished work and the joints are finer and more even.

As a modified form of my invention, a brazing rod may be manufactured wherein the outer shell is made of the exact composition desired in the final deposited alloy. Thus, a brazing rod adapted for the same purposes as the first example may be made by constructing the outer tube or shell of a bronze composition having the analysis, copper 60%, zinc 38% and tin 2% and placing within the container the desired amount of flux without the addition of any spelter. The rod is, however, subjected to the same heat treatment to fuse the flux and thus cause the same to permanently adhere to the walls of the container.

While various methods may be employed in constructing the brazing rod, the preferred method is to do so by a continuous process, starting with a thin strip of the alloy forming the outer container and subjecting the strip successively to a tube-forming process, a filling process and a heat treatment process. For a more complete description of this method, reference should be made to the accompanying drawings.

Figure 1 is a diagrammatic view illustrating the manufacture of the brazing rod;

Figure 2 is a cross section on the line 2—2 of Figure 1;

Figure 3 is a cross section on the line 3—3 of Figure 1;

Figure 4 is a cross section on the line 4—4 of Figure 1;

Figure 5 is a cross section of the finished product taken on the line 5—5 of Figure 1.

Referring now to the drawings, the letter A represents a flat strip which is fed continuously over suitable roller guides B and through a tube-forming device C, where the sides of the strip are bent upwardly to form the U-shaped cross section illustrated in Figure 3. D represents a hopper into which the mixture of flux and spelter is placed and fed into the U-shaped shell. E represents a tubular furnace through which the filled tube is drawn, the strip being designed to cause the flux to be fused while traveling through the same. F represents the finished brazing rod after it has emerged from the furnace and has been sufficiently cooled to cause the flux to solidify and adhere to the spelter and the side walls of the tube.

It will be understood that while I have illustrated a preferred method of manufacturing the brazing rod, my invention is not necessarily limited to this method since other methods might be used to obtain a composition coming within the purview of my invention. It is also to be understood that my invention in its broader aspects may be applied to composite rods used not only for brazing purposes but also for welding and soldering, and may have combinations of ingredients such as to form alloy compositions suitable for various purposes.

What I claim as my invention is:

A composite rod for welding, brazing and like purposes comprising an outer metallic shell of brass containing from 60 to 66⅔% copper and 40 to 33⅓% zinc, comminuted metal containing approximately 60% copper, 37% zinc and 3% tin within said shell, and a flux of borax fused into engagement with both said comminuted metal and said outer shell.

In testimony whereof I affix my signature.

NORMAN S. HARRINGTON.